S. J. ROSS.
COMBINED KETTLE HOLDER AND STRAINER.
APPLICATION FILED APR. 25, 1912.
1,069,812.
Patented Aug. 12, 1913.
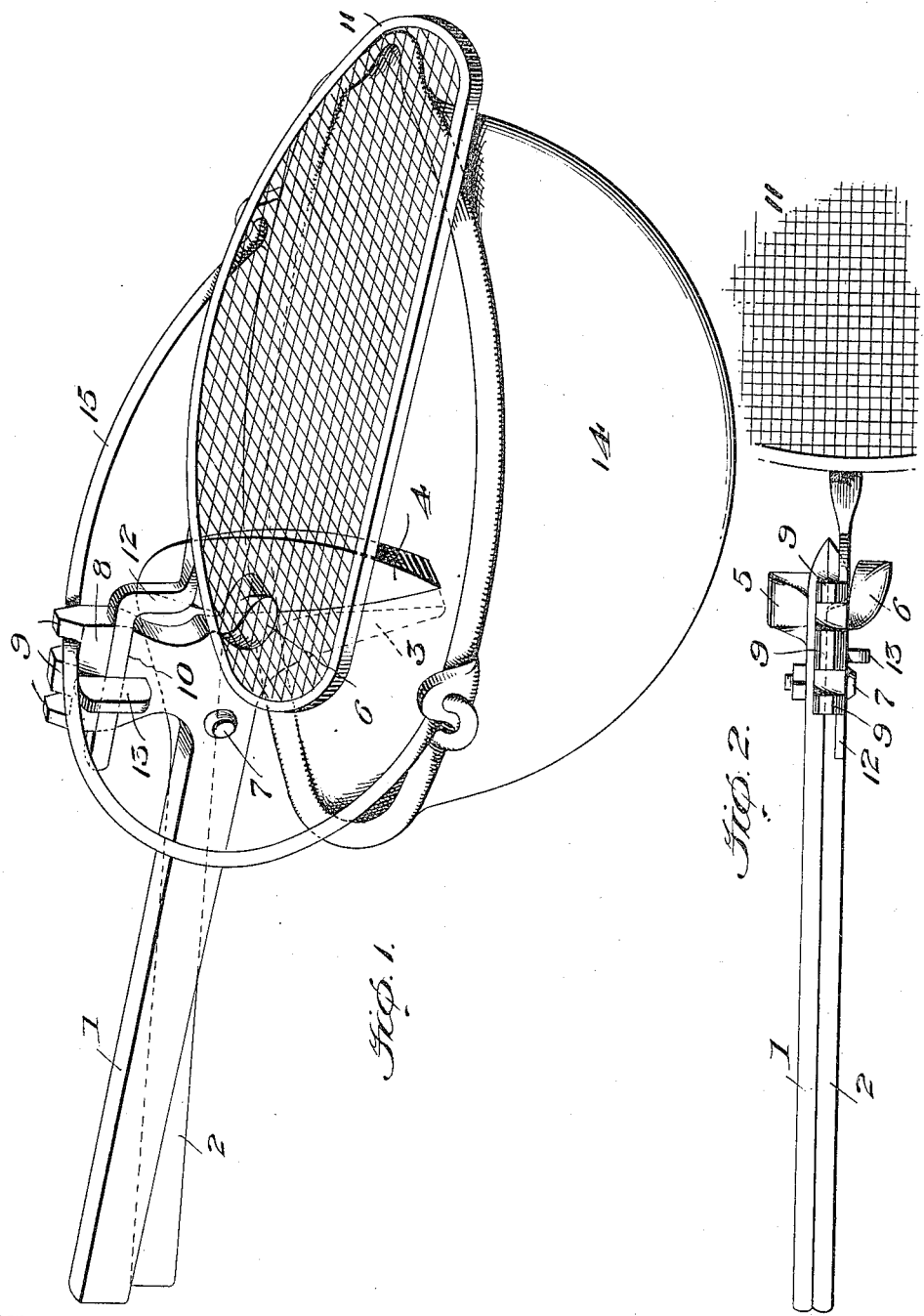

UNITED STATES PATENT OFFICE.

SAMUEL J. ROSS, OF MOULTON, IDAHO.

COMBINED KETTLE HOLDER AND STRAINER.

1,069,812.

Specification of Letters Patent.   Patented Aug. 12, 1913.

Application filed April 25, 1912.   Serial No. 693,155.

*To all whom it may concern:*

Be it known that I, SAMUEL J. ROSS, a citizen of the United States, residing at Moulton, county of Cassia, and State of Idaho, have invented certain new and useful Improvements in Combined Kettle Holders and Strainers, of which the following is a specification.

This invention relates to combined kettle holders and strainers.

My object is the provision of a new gripping handle adapted to engage the side of a kettle or other vessel and at the same time engaging the bail of such kettle or other vessel, whereby a secure hold is obtained on the vessel, enabling the user to easily and conveniently manipulate the kettle without danger of any tilting of the latter or of burning or scalding the user.

In this respect, the invention consists of a gripping handle or tool adapted to grasp or grip the side of the kettle or vessel and provided with means to engage the kettle bail at the same time.

Another object of the invention is the provision of a combined kettle or vessel holder and strainer, the former adapted to engage the side of the vessel and the latter to be thereupon disposed over the kettle, especially at the pouring part thereof, whereby the liquid contents may be readily poured out and the solid contents maintained in the kettle or vessel.

In this respect, the invention consists in the combination of a holder and a strainer.

The invention consists, further, in a combined holder and strainer adapted for engaging the side of a kettle or vessel and when so engaged for holding the bail of the kettle or vessel, together with a strainer combined with the holder and adapted to be disposed above the kettle.

In the accompanying drawings:—Figure 1 is a perspective showing the complete invention applied to a kettle; and Fig. 2, a plan view of the complete device, parts of the strainer being broken away.

The holder has a pair of handles 1 and 2, having the respective jaws 3 and 4 disposed in angular relation thereto, each jaw preferably being provided with a laterally extending lug 5 and 6, respectively. The handles are pivoted together on a suitable bolt or connection 7. One of the handles has an upward extension 8 provided with one or more teeth 9, and at its side it has a groove or slot 10. A bridge 13 extends across the slot 10 and is formed integral with or connected to the handle.

The strainer 11 is of such size and shape that it will be adapted to extend over the kettle or vessel with which the device is used in such position as to retain the solid contents of the kettle while allowing the fluid contents to be poured off. It is not necessary for the strainer to cover the entire kettle, but it may conveniently be of the size and shape shown and of sufficient length so that its outer part preferably extends beyond the wall of the kettle. The strainer has an arm 12 adapted to fit in the slot or groove 10 and to be retained therein by the overhanging part or bridge 13, said arm 12 being adapted for adjustment in the slot so as to dispose the strainer in different positions if the kettle or vessel is unusually large.

In Fig. 1, I have shown how the invention is adapted for application to an ordinary kettle 14 having a bail 15. The jaws 3 and 4 are slipped over the edge of the kettle 14, whereupon the lugs or ears 5 and 6 bear upon the upper edge of the kettle 14, thus preventing any lateral rocking or twisting of the holder when in position. When the handles 1 and 2 are grasped, the jaws 3 and 4 are firmly clamped against the inner and outer surfaces of the side of the kettle. The bail 15 will naturally fall back of one of the teeth 9 and engage it. The kettle can now be manipulated and its contents poured off, if desired, without any danger of any sidewise twisting or tilting of the kettle or likelihood of burning or scalding the user. If it is desired to use the strainer, it will be connected to the tool prior to the application of the latter to the kettle.

Having thus described my invention, what I claim as new and desire to secure by Letters Patent, is:—

1. A kettle holder having jaws pivoted together and provided with handles, the jaws being adapted for straddling an edge of a kettle when the handles are brought together, and a plurality of teeth on one of the handles positioned so as to be adapted for engaging the kettle bail when the jaws are engaged with the end of the kettle.

2. In a combined kettle holder and strainer, the combination with handled jaws pivoted together and adapted to embrace an edge of the kettle, of a strainer having an adjustable connection with one of the jaws, said strainer being arranged so that it will be positioned over the kettle when the jaws are engaged with the edge of the kettle and the adjustable connection affording means whereby the strainer may be moved crosswise of the kettle.

3. In a combined kettle holder and strainer, the combination of pivoted handles having jaws adapted to straddle the side of the kettle, said holder having an upwardly extending part provided with teeth and also provided with a slot, a strainer arranged to be positioned over the kettle, when the jaws straddle the edge of the kettle, and an arm on the strainer which is slidable in the said slot.

In testimony whereof, I hereunto affix my signature in presence of two witnesses.

SAMUEL J. ROSS.

Witnesses:
L. E. BRONSON,
ROY EAMES.

Copies of this patent may be obtained for five cents each, by addressing the "Commissioner of Patents, Washington, D. C."